US010384877B2

(12) United States Patent
Quinn et al.

(10) Patent No.: US 10,384,877 B2
(45) Date of Patent: Aug. 20, 2019

(54) SPRING ASSEMBLY WITH TRANSVERSE ATTACHMENT SITE

(71) Applicant: General Kinematics Corporation, Crystal Lake, IL (US)

(72) Inventors: Kerry Quinn, Palatine, IL (US); Ed Steffes, Jr., Woodtsock, IL (US); Matt Pennington, Lakewood, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

(21) Appl. No.: 15/836,808

(22) Filed: Dec. 8, 2017

(65) Prior Publication Data

US 2019/0177092 A1      Jun. 13, 2019

(51) Int. Cl.
*B07B 1/28* (2006.01)
*B07B 1/30* (2006.01)
(Continued)

(52) U.S. Cl.
CPC ............. *B65G 27/26* (2013.01); *B65G 27/04* (2013.01); *B65G 27/20* (2013.01); *F16B 2/065* (2013.01);
(Continued)

(58) Field of Classification Search
CPC ........ B65G 27/26; B65G 27/04; B65G 27/20; B65G 27/08; B65G 33/16; B65G 33/32;
(Continued)

(56) References Cited

U.S. PATENT DOCUMENTS 2,441,167 A * 5/1948 Raspet .................. F16F 1/042
                                                       267/180
2,861,768 A    11/1958 Roccati
(Continued)

FOREIGN PATENT DOCUMENTS

DE    102009014176 A1 *  9/2010  ........... F16H 7/1218
EP    3 199 252           8/2017
(Continued)

OTHER PUBLICATIONS

"DE 20 2010 012 153 U1", Derwent document. (Year: 2011).*
(Continued)

*Primary Examiner* — Mark A Deuble
(74) *Attorney, Agent, or Firm* — Cook Alex Ltd.

(57) ABSTRACT

A spring assembly includes a resilient member having a first and second end shanks and a central helical portion. The first end shank extends in a first direction from the central helical portion, and has a longitudinal axis from a proximal end to a distal end. The second end shank extends in a second, opposite direction from the central helical portion, and has a longitudinal axis from a proximal end to a distal end. The central helical portion includes one or more coils disposed about a central longitudinal axis, and has a first end attached to the proximal end of the first end shank and a second end attached to the proximal end of the second end shank. The axes of the shank ends and the axis of the central helical portion are parallel or are collinear. The assembly also includes an attachment site at each of the end shanks.

20 Claims, 4 Drawing Sheets

(51) Int. Cl.
  *B07B 4/08* (2006.01)
  *F16B 2/06* (2006.01)
  *B65G 27/04* (2006.01)
  *B65G 27/20* (2006.01)
  *B65G 27/26* (2006.01)

(52) U.S. Cl.
  CPC ............... *B07B 1/284* (2013.01); *B07B 1/30* (2013.01); *B07B 4/08* (2013.01)

(58) Field of Classification Search
  CPC . F16B 2/065; B07B 1/284; B07B 1/30; B07B 4/08; F16F 1/04; F16F 1/042; F16F 1/06; F16F 1/065; F16F 1/12; F16F 1/122; F16F 1/123
  See application file for complete search history.

(56) References Cited

U.S. PATENT DOCUMENTS

| | | | |
|---|---|---|---|
| 2,880,992 A * | 4/1959 | Gubernick | F16F 1/06 174/135 |
| 3,848,343 A | 11/1974 | Musschoot | |
| 4,541,301 A | 9/1985 | Ono et al. | |
| 4,565,279 A | 1/1986 | Musschoot | |
| 4,617,832 A | 10/1986 | Musschoot | |
| 4,779,662 A * | 10/1988 | Wilk | E06B 9/90 160/298 |
| 5,131,525 A | 7/1992 | Musschoot | |
| 5,178,259 A | 1/1993 | Musschoot | |
| 5,669,711 A | 9/1997 | Spence, III et al. | |
| 5,934,446 A | 8/1999 | Thomson | |
| 6,112,883 A * | 9/2000 | Kraus | B65G 27/08 198/759 |
| 6,341,767 B1 | 1/2002 | Seale et al. | |
| 6,702,102 B2 * | 3/2004 | Kraus | B06B 1/16 198/758 |
| 8,528,189 B1 | 9/2013 | Smith et al. | |
| 8,998,043 B2 | 4/2015 | Fruit et al. | |
| 2007/0125624 A1 | 6/2007 | Massman | |
| 2011/0124243 A1* | 5/2011 | Park | B21F 3/02 439/816 |
| 2016/0230814 A1* | 8/2016 | Schumann | F16D 13/08 |
| 2016/0369784 A1* | 12/2016 | Brown | F03G 7/065 |
| 2017/0130794 A1* | 5/2017 | Spaulding | F16H 63/3433 |
| 2018/0283489 A1* | 10/2018 | Faria | F16D 3/12 |

FOREIGN PATENT DOCUMENTS

| | | | |
|---|---|---|---|
| FR | 2 518 670 | 6/1983 | |
| FR | 2 877 063 | 4/2006 | |
| GB | 191313068 A * | 3/1914 | ............. F16F 1/042 |
| GB | 417601 | 10/1934 | |
| GB | 524489 | 8/1940 | |
| JP | S41-2169 | 2/1966 | |
| JP | S58-137885 | 9/1983 | |
| JP | 62209238 A * | 9/1987 | ............. F16F 1/12 |
| JP | 09264332 A * | 10/1997 | |
| WO | WO 03/042076 | 5/2003 | |

OTHER PUBLICATIONS

European Patent Office, Extended European Search Report, counterpart EP Appl. No. 18211287 (dated Apr. 26, 2019) (14 pages).

* cited by examiner

SPRING ASSEMBLY WITH TRANSVERSE ATTACHMENT SITE

BACKGROUND

This patent is directed to a spring assembly with a transverse attachment site, and a vibratory apparatus including a spring assembly with a transverse attachment site.

In a two-mass vibratory apparatus, a first mass (or exciter mass) is attached to a second mass (e.g., trough) by one or more reactor springs. Often, these reactor springs are in the form of coil springs having an end loop disposed at either end. A washer is placed over one of the end loops, and a fastener (typically a bolt and nut pair) is disposed through the washer and the end loop to secure the coil spring to the first mass or to the second mass.

The end loops of the coil spring are conventionally disposed such that the openings of the end loops are aligned with a central longitudinal axis of the coil spring. The loops can be accessed from the outside along the central longitudinal axis, or from the inside of the coils of the spring along the central longitudinal axis. Access to the end loop from the inside of the coils is complicated by the coils and the end loops, which limit access to the space inside the coils by forming a cage-like structure about this inner space.

Consequently, conventional coil springs present a number of challenges. First, because the coils and end loops obstruct or limit access to the inner space, installing and removing the nut/bolt pair can be complicated, which in turn creates manufacturing and servicing issues. Second, because the nut-bolt pair is installed with the axis of the bolt aligned with the longitudinal axis of the spring, the bolts have a tendency to become loose because of the axial loading. Third, because the bolt must pass through a portion of the first mass or the second mass and the end loop (which can be quite thick), a long bolt must be used to accommodate the sum of all of these thicknesses.

It would be advantageous to overcome or substantially ameliorate one or more of the disadvantages of existing springs, or at least to provide a useful alternative.

SUMMARY

According to an aspect of the present disclosure, a spring assembly includes a resilient member having a first end shank, a second end shank, and a central helical portion. The first end shank extends in a first direction from the central helical portion from a proximal end to a distal end, and has a longitudinal axis from the proximal end to the distal end. The second end shank extends in a second direction from the central helical portion from a proximal end to a distal end, and has a longitudinal axis from the proximal end to the distal end. The second direction is opposite the first direction. The central helical portion includes one or more coils disposed about a central longitudinal axis, and has a first end attached to the proximal end of the first end shank and a second end attached to the proximal end of the second end shank. The longitudinal axis of the first shank end, the longitudinal axis of the second shank end, and the central longitudinal axis of the central helical portion are parallel to each other or are collinear. The assembly also includes a transverse attachment site at each of the first end shank and the second end shank.

According to another aspect of the present disclosure, a vibratory apparatus includes a deck and an exciter assembly coupled to the deck, the exciter assembly including at least one eccentric mounted on a shaft. The shaft is coupled to the deck with one or more spring assemblies. The spring assemblies include a resilient member having a first end shank, a second end shank, and a central helical portion. The first end shank extends in a first direction from the central helical portion from a proximal end to a distal end, and has a longitudinal axis from the proximal end to the distal end. The second end shank extends in a second direction from the central helical portion from a proximal end to a distal end, and has a longitudinal axis from the proximal end to the distal end. The second direction is opposite the first direction. The central helical portion includes one or more coils disposed about a central longitudinal axis, and has a first end attached to the proximal end of the first end shank and a second end attached to the proximal end of the second end shank. The longitudinal axis of the first shank end, the longitudinal axis of the second shank end, and the central longitudinal axis of the central helical portion are parallel to each other or are collinear. The assembly also includes a transverse site at each of the first end shank and the second end shank, the attachment site of the first end attached to the deck and the attachment side of the second end attached to the exciter assembly.

According to another aspect of the present disclosure, a vibratory apparatus includes a deck, a vibration generator coupled to the deck, and one or more spring assemblies coupled to the deck to support the deck on a surface. The spring assemblies include a resilient member having a first end shank, a second end shank, and a central helical portion. The first end shank extends in a first direction from the central helical portion from a proximal end to a distal end, and has a longitudinal axis from the proximal end to the distal end. The second end shank extends in a second direction from the central helical portion from a proximal end to a distal end, and has a longitudinal axis from the proximal end to the distal end. The second direction is opposite the first direction. The central helical portion includes one or more coils disposed about a central longitudinal axis, and has a first end attached to the proximal end of the first end shank and a second end attached to the proximal end of the second end shank. The longitudinal axis of the first shank end, the longitudinal axis of the second shank end, and the central longitudinal axis of the central helical portion are parallel to each other or are collinear. The assembly also includes a transverse attachment site at each of the first end shank and the second end shank, the attachment site of the first end shank attached to the deck and the attachment side of the second end shank attached to the surface.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

DETAILED DESCRIPTION OF VARIOUS EMBODIMENTS

Figure 1:
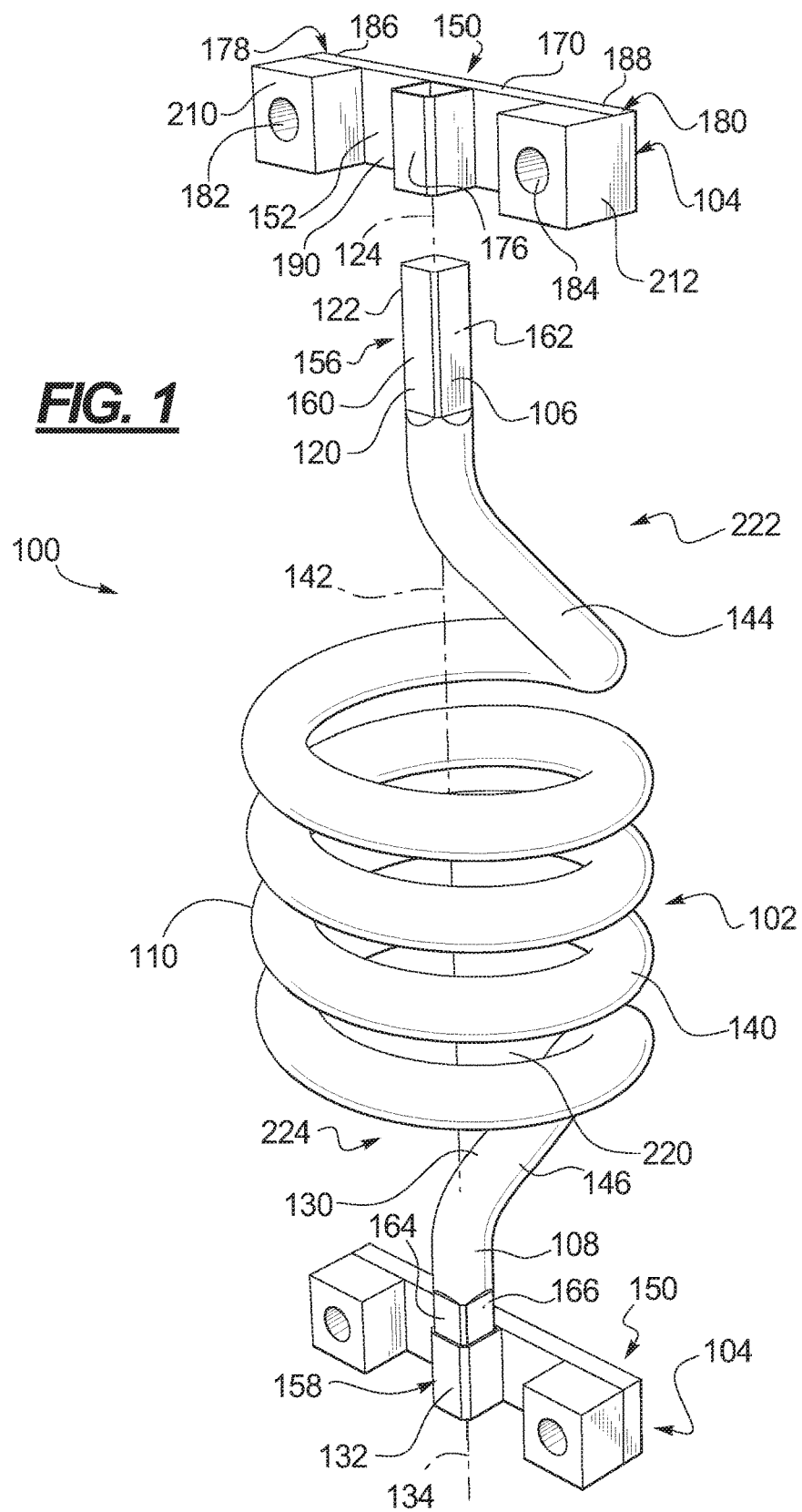
FIG. 1 is a perspective view of a spring assembly.

A spring assembly 100 according to one or more embodiments of the present disclosure is illustrated in FIGS. 1-4. In all of these embodiments, a spring assembly includes a resilient member 102 having multiple attachment sites (at least two) 104. See FIG. 1. The resilient member 102 has a first end shank 106, a second end shank 108, and a central helical portion 110. The attachment sites 104 are disposed at each of the first end shank 106 and the second end shank 108.

The first end shank 106 extends in a first direction from the central helical portion 110 from a proximal end 120 to a distal end 122. The first end shank 106 has a longitudinal axis 124 from the proximal end 120 to the distal end 122.

The second end shank 108 extends in a second direction from the central helical portion 110 from a proximal end 130 to a distal end 132. The second end shank 108 has a longitudinal axis 134 from the proximal end 130 to the distal end 132. The second direction is opposite the first direction.

The central helical portion 110 including one or more coils 140 disposed about a central longitudinal axis 142. The central helical portion 110 has a first end 144 attached to the proximal end 120 of the first end shank 106 and a second end 146 attached to the proximal end 130 of the second end shank 108. Further, the longitudinal axis 124 of the first shank end 106, the longitudinal axis 134 of the second shank end 108, and the central longitudinal axis 142 of the central helical portion 110 are parallel to each other or are collinear.

Figure 5:
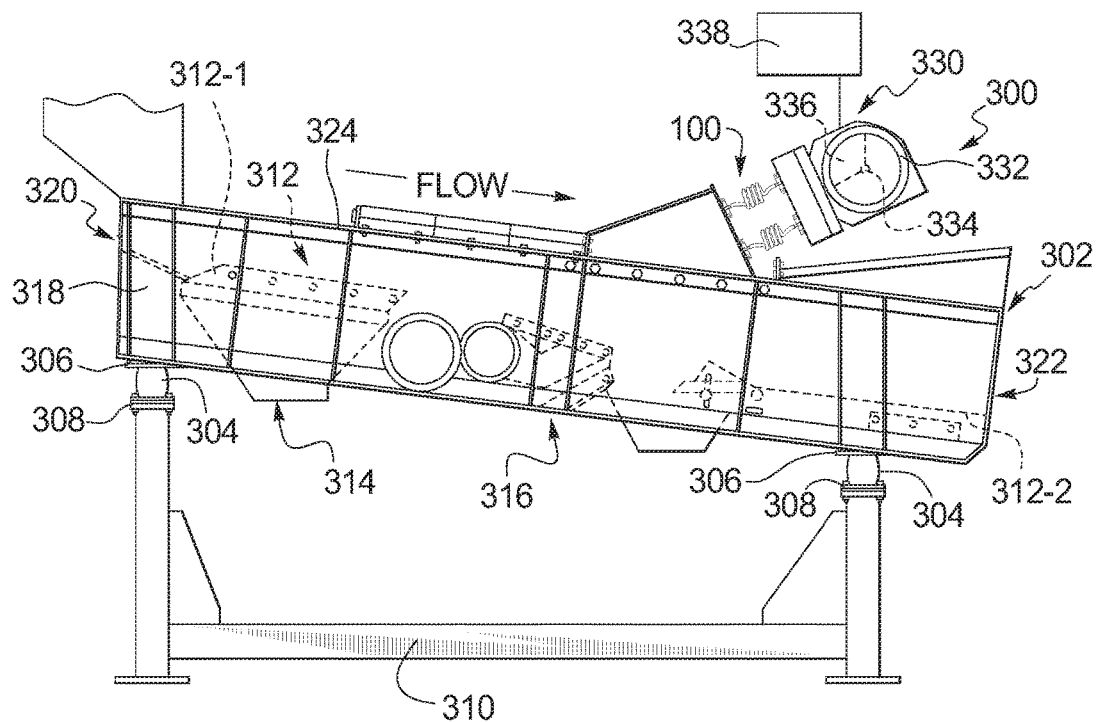
FIG. 5 is a side view of a vibratory apparatus incorporating a plurality of the spring assemblies of FIG. 1.
Figure 6:
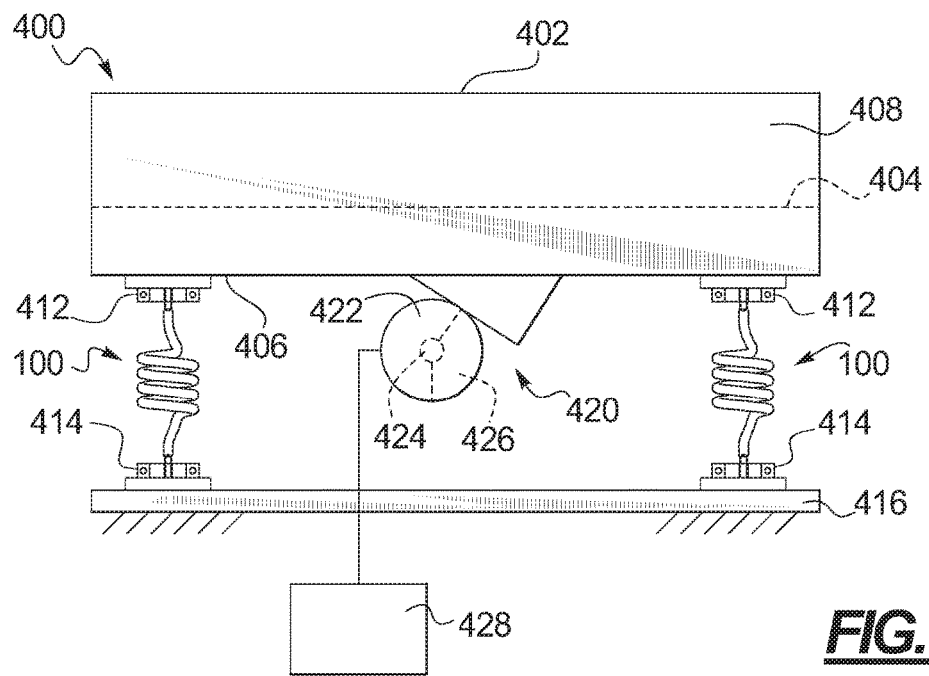
FIG. 6 is a side view of another vibratory apparatus incorporating a plurality of the spring assemblies of FIG. 1.

In operation, as discussed in detail below, the attachment site 104 is used to secure the spring assembly 100 to a vibratory apparatus. For example, as illustrated in FIG. 5, the spring assembly 100 is used as a reactor (or drive) spring, and is attached between a first mass (an exciter) and a second mass (a trough). As an alternative, as illustrated in FIG. 6, the spring assembly 100 may be used an isolation spring, and is attached between the vibratory apparatus and ground (e.g., a surface on which the vibratory apparatus is disposed).

According to the illustrated embodiments, the attachment site 104 attaches the first and second end shanks 106, 108 of the spring assembly 100 to, for example, the first and second masses using fasteners (e.g., nut and bolt pairs) where the axis of the fastener (e.g., the bolt) is transverse to the axes 124, 134 of the end shanks 106, 108 and the central axis 142 of the helical portion 110. An attachment site that permits the fastener to be so arranged may be referred to herein as a transverse attachment site. Such a transverse arrangement may provide one or more advantages, including a perpendicular loading of the fastener (as compared to an axial loading). A non-exhaustive listing of other advantages is provided below.

Figure 2:
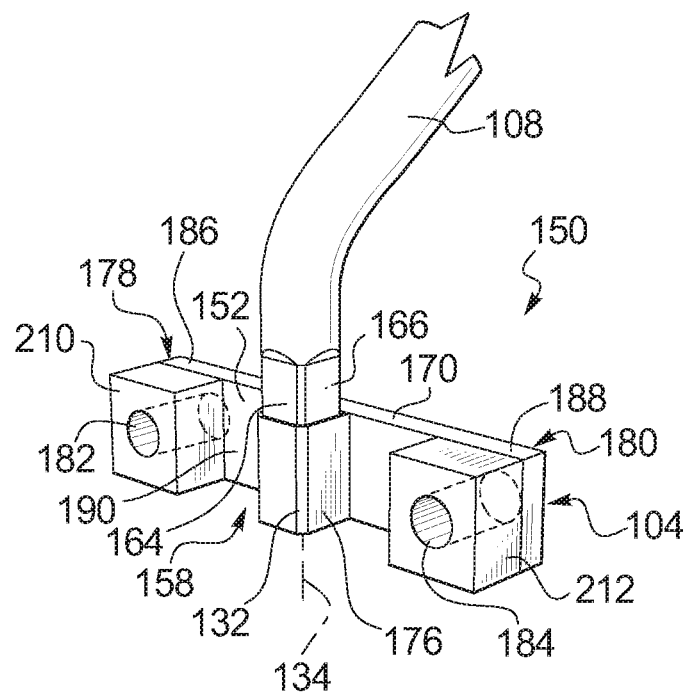
FIG. 2 is an enlarged perspective view of one of a pair of end shanks of the spring assembly of FIG. 1 with an attachment site in the form of a clamp.
Figure 3:
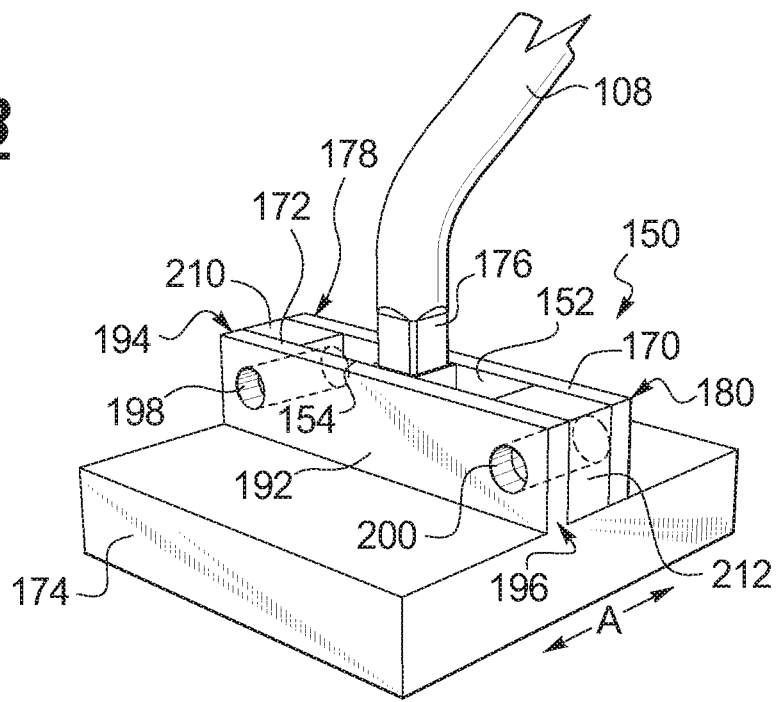
FIG. 3 is an enlarged perspective view of the attachment site in the form of a clamp from FIG. 2, with both subassemblies of the clamp aligned with an end shank disposed therebetween.

Having thus described the structure and operation of the embodiments in general terms, the details of the illustrated embodiments are discussed starting with the embodiment of FIGS. 1-3.

As illustrated in FIGS. 1-3, the first and second end shanks 106, 108 are formed to have a shape that is configured to promote use of the spring assembly 100 with an attachment site 104 in the form of a clamp 150 having planar faces 152, 154. Compare FIGS. 1, 2 with FIG. 3. To this end, while the remainder of the spring assembly 100 may have a circular (or even oval) cross section, the first end shank 106 and the second end shank 108 each comprise a linear bar 156, 158 having a quadrilateral cross-section in a plane perpendicular to the respective longitudinal axis 124, 134. The planar surfaces of the faces 160, 162, 164, 166 of linear bar 156, 158 facilitate transmission of forces across an area of contact with a clamp 150 having planar faces 152, 154. According to the embodiments discussed herein, the quadrilateral cross-section in a plane perpendicular to the longitudinal axis may be rectangular, or may even be square.

In FIGS. 1-3, the attachment site 104 is a clamp 150 that may be attached to one of the first end shank 106 and the second end shank 108, the clamp 150 having at least one hole therethrough configured to accept a bolt. According to the illustrated embodiment, clamps 150 may be attached to both the first and second end shanks 106, 108.

According to the illustrated embodiment, the attachment site 104 in the form of a clamp 150 comprises a first subassembly 170 attached directly to one of the first and second end shanks 106, 108 (see FIGS. 1, 2), and a second subassembly 172 attached directly to a portion of a vibratory apparatus 174, for example (see FIG. 3).

Thus, the clamp 150 (and in particular the first subassembly 170 of the clamp 150) includes a central holder 176 configured to receive one of the first end shank 106 and the second end shank 108, and also includes first and second distal ends 178, 180. The distal ends 178, 180 are disposed transverse to the longitudinal axis 124, 134 of the one of the first end shank 106 and the second end shank 108, and each have a hole 182, 184 therethrough configured to accept a bolt. The distal ends 178, 180 are disposed at opposite ends 186, 188 of a bar 190 that is itself disposed transverse to the longitudinal axis 124, 134 of the respective first or second end shank 106,108.

As such, the holes 182, 184 in the distal ends 178, 180 of this portion of the clamp 150 are disposed transverse to the longitudinal axis 124, 134 of the first or second end shank 106, 108 associated with that subassembly 170. Thus, a bolt disposed through that hole 182, 184 will have its axis disposed transverse (or perpendicular) to the longitudinal axis 124, 134 of the respective first or second end shank 106, 108.

The clamp 150 (and in particular the second subassembly 172 of the clamp 150) also includes a bar 192 with first and second distal ends 194, 196, this bar 192 being attached to the vibratory apparatus 174, for example. See FIG. 3. The distal ends 194, 196 each have a hole 198, 200 therethrough configured to accept a bolt. The holes 198, 200 of the second subassembly 172 of the clamp 150 are spaced to align with the holes 182, 184 in the first and second distal ends 178, 180 of the first subassembly 170 of the clamp 150. See FIG. 3. With the holes 182, 184, 198, 200 aligned, the first or second end shank 106, 108 (disposed in its respective holder 176) is disposed between the bars 190, 192, and tightening the fasteners disposed through the aligned holes 182, 184, 198, 200 will cause urge the bars 190, 192 (and in particular, faces 152, 154) into contact with the first or second end shank 106, 108. See FIG. 3

The clamp 150 may also include one or more spacers 210, 212 that are attached to either the bar 190 of the first subassembly 170 or the bar 192 of the second subassembly 172. See, e.g., FIG. 2. The spacers 210, 212 may limit the amount of force that can be applied to the distal end 122, 132 of the end shanks 106, 108 according to the thickness of the spacer 210, 212 relative to the thickness of the distal end 122, 132 in the transverse direction indicated by arrow A in FIG. 3. As illustrated, the spacers 210, 212 are disposed at the distal ends 186, 188 of the bar 190 of the first subassembly 170, and the holes 182, 184 in the distal ends 178, 180 of the first subassembly 170 extend or depend through the spacers 210, 212 as well as the distal ends 186, 188 of the bar 190. Alternatively, the holes need not be disposed through the spacers 210, 212 (e.g., the spacers 210, 212 may be disposed transversely inward or outward of the holes 182, 184).

According to certain embodiments, the attachment sites 104 may be used in challenging environments where water, for example, is present. In such an environment, it may be desirable to apply a layer of elastomeric material to the surfaces that contact. For example, the distal ends 122, 132 of the first and second end shanks 106, 108 may have a layer of elastomeric material applied thereto as a moisture barrier.

Furthermore, while the embodiments above have been described relative to a fastener in the form of a nut/bolt pair, it is possible to use other fasteners instead. For example, a rivet may be used to connect the first and second subassemblies 170, 172 together. Further alternative embodiments may include a chuck-like holder where the end shank 106, 108 is grasped in one or more tangential planes (relative to the axes 124, 134) by one or more jaws that are disposed about the end shank 106, 108.

In addition, the central helical portion 110 may comprise a plurality of coils 140 disposed about the central longitudinal axis 142. These coils 140 may be spaced apart such that there are spaces 220 between coils 140 that are adjacent each other in a longitudinal direction (e.g., one above the other). The helical coil 110 has two distal ends 144 and 146. See FIG. 1. Further, these coils 140 may have a curved transition 222, 224 at the first and second ends 144, 146 that attach to the first and second end shanks 106, 108, rather than an abrupt turn or bend in the coil at the first and second ends 144, 146 of the central helical portion 110.

While the end shanks 106, 108 and the central helical portion 110 may comprise separate structural elements that are attached by welding, for example, the end shanks 106, 108 and the central helical portion 110 instead may be formed such that the structure of the end shanks 106, 108 and central helical portion 110 is an integral (i.e., one-piece) structure. In an integral structure, it is still proper to refer to the end shanks 106, 108 as being attached at the ends 144, 146 of the central helical portion 110, even if a joining method, such as welding, is not used to form the attachment.

Figure 4:
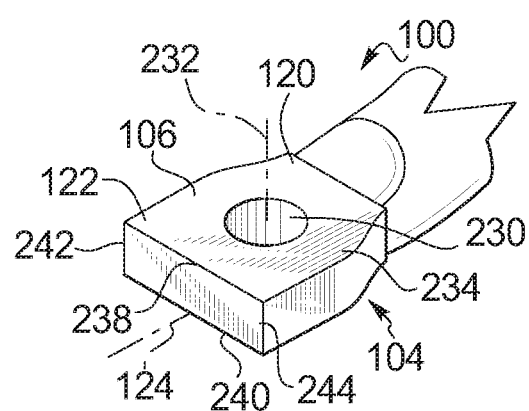
FIG. 4 is an enlarged, perspective view of a distal portion of an end shank of a further embodiment of a spring assembly with a different attachment site.

FIG. 4 illustrates another embodiment of the spring assembly 100, and in particular an embodiment of the attachment site 104 that may be used as part of the spring assembly 100. Because these embodiments share structures in common with the embodiments of FIGS. 1-3, identical numbers will be used for similar structures.

Further, rather than illustrating all of the structures that the spring assembly 100 of FIG. 4 shares in common with the embodiment illustrated in FIGS. 1-3, portions of those structures have been omitted, in whole or in part, to concentrate on the differences. Thus, it will be recognized that FIG. 4 illustrates only the distal end 122 of a first end shank 106 of a resilient member 102 according to a different embodiment, which embodiment would include a central helical portion and a second end shank with a similarly structured distal end.

According to the illustrated embodiment 100 of FIG. 4, the end shanks (and in particular the distal end 122 of the end shank 106, as illustrated) have a hole 230 extending or depending therethrough, the hole 230 having an axis 232 that is transverse to a longitudinal axis 124 of the end shank 106. As such, if the end shank 106 were to be secured to a structure similar to the second subassembly 172 illustrated in FIG. 3, the fastener passing through the hole 124 in the end shank 106 and the holes 198, 200 in the second subassembly 172 would be transverse to both structures (the end shank 106 and the second subassembly 172).

Thus, in more general terms, the embodiment of the spring assembly 100 of FIG. 4 has at least one of a first end shank and a second end shank with a hole formed therethrough. The hole has an axis that is transverse a longitudinal axis of the first end shank or the second end shank, which hole defines an attachment site. According to certain embodiments, both of the first end shank and the second end shank have a hole formed therethrough having an axis that is transverse to the longitudinal axis of the respective first end shank or the second end shank, which hole defines the attachment site.

FIG. 4 illustrates an embodiment where the distal end 122 of the end shank 106 is widened relative to the end shanks 106 illustrated in FIGS. 1-3. According to this embodiment, as illustrated, the first end shank 106 includes a linear bar 234 having a rectangular cross-section in a plane perpendicular to the longitudinal axis 124. The linear bar 234 has opposing sides 238, 240 of first dimension in a plane perpendicular to the longitudinal axis 232 and opposing ends 242, 244 of second dimension in a plane perpendicular to the longitudinal axis 124. The first dimension is larger than the second dimension. Further, the linear bar 234 has at least one hole 230 extending between the opposing sides 238, 240 of the first end shank 106. In a similar fashion, the embodiment would also have at least one hole extending between similar opposing sides of the second end shank and defining the attachment site.

The shape of the end shank 106 in FIG. 4 provides a more constant amount of material in a radial direction than the embodiment illustrated in FIGS. 1-3, for example. This may be advantageous in addressing the stresses that may be transmitted through the end shank 106 (and in particular, the distal end 122 of the end shank 106).

As mentioned above, the spring assembly 100 may be included as one of more of the reactor springs of a vibratory apparatus, one embodiment of which is illustrated in FIG. 5. In such an application, the vibratory apparatus may include a deck, and an exciter assembly coupled to the deck. The exciter assembly may include at least one eccentric mounted on a shaft, the shaft being coupled to the deck by one or more spring assemblies. Each of the spring assemblies may include a resilient member having a first end shank, a second end shank, and a central helical portion. The first end shank extends in a first direction from the central helical portion from a proximal end to a distal end, and has a longitudinal axis from the proximal end to the distal end. The second end shank extends in a second direction from the central helical portion from a proximal end to a distal end, and has a longitudinal axis from the proximal end to the distal end. The second direction is opposite the first direction. The central helical portion includes one or more coils disposed about a central longitudinal axis, the central helical portion having a first end attached to the proximal end of the first end shank and a second end attached to the proximal end of the second end shank. The longitudinal axis of the first shank end, the longitudinal axis of the second shank end, and the central longitudinal axis of the central helical portion are parallel to each other or are collinear. The spring assemblies also include an attachment site at each of the first end shank and the second end shank, the attachment site of the first end attached to the deck and the attachment side of the second end attached to the exciter assembly.

Having thus described the spring assembly as part of a vibratory apparatus in general terms, the structure of a vibratory apparatus and the integration of one or more spring assemblies in that vibratory apparatus are now discussed in detail in regard to the embodiment of the vibratory apparatus and the spring apparatus illustrated in FIG. 5.

FIG. 5 illustrates an embodiment of a vibratory apparatus 300, in the form of a separator or classifier. This embodiment is intended to be a non-limiting example of the possible apparatuses that may include a spring assembly 100 according to one or more of the embodiments described herein.

Embodiments of the vibratory apparatus may vary, for example, as to the function of the apparatus (e.g., conveyor, feeder, drum, etc.), the shape of the trough (e.g. linear trough, curved trough, cylindrical drum, etc.), the structures that support the trough and the manner of operation and structure of the vibration generator or vibrator, as will be touched on briefly below.

As noted in the preceding paragraph, the apparatus 300 may include a trough 302 that is supported above a surface by a plurality of resilient members 304. The resilient members 304 (which may be referred to as isolation springs in this embodiment) may be attached at one end 306 to the trough 302 and at a second end 308 to a surface or ground, often via a support structure or frame 310 that may be bolted or otherwise secured to the surface or ground. According to the illustrated embodiment, the isolation springs 304 may be marshmallow-type springs.

The trough 302 includes a deck 312, which deck 312 may be solid or may have one or more passages therethrough to permit materials of a first size to move over the deck 312 and of a second, smaller size to pass through the deck 312. The trough 302 may include a floor beneath the deck 312, or there may be an opening 314 in the trough 302 beneath the deck 312, as illustrated. Further, the deck 312 may include one or more deck sections 312-1, 312-2, which sections may be integrated with other equipment, such as an air knife 316 as illustrated.

The trough 302 may also include sidewalls 318 (one of which is illustrated) disposed at either side of the deck 312 between an inlet end 320 and an outlet end 322. The sidewalls 318 may be attached directly to the deck 312 at either side of the deck 312. According to certain embodiments, a hood 324 may be disposed above the deck 312 and attached to the sidewalls 318 to limit the amount of material that exits the apparatus 300 other than through the openings 314 below the deck 312 or out the outlet end 322.

An exciter or exciter assembly (or two-mass vibration generator) 330 may be coupled to the trough 302 (e.g., by being connected or attached to the sidewalls 318), and thus be coupled to the deck 312. The exciter 330 may include a motor 332 having a shaft 334 to which one or more eccentric weights 336 are attached, for example. According to other embodiments, the exciter 330 may include pneumatic and/or hydraulic actuators instead of the motor 332. For that matter, the shaft 334 and weights 336 may be attached to the trough 302, while the motor 332 is coupled to the shaft 334, but not mounted on the apparatus 300.

The motor 332, shaft 334 and weights 336 (or simply shaft 334 and weights 336) may be coupled to the trough 302 via one or more of the spring assemblies 100, as illustrated, acting as reactor springs. The exciter 330 may cause motion of the trough 302 and associated deck 312, as well as motion of objects disposed on the deck 312. The exciter 330 may cause the objects to move from the inlet end 320 to the outlet end 322 (e.g., in a series of gentle catches and throws along a linear deck or in a rolling, tumbling motion along a curved deck), may cause the objects to move up and down without significant lateral motion relative to either end, or some combination thereof.

The operation of the exciter 330 may be controlled by a controller 338 that may be coupled to the exciter 330, particularly to the motor 332. The controller 338 may be programmable, and may vary the operation of the exciter 330.

It will be recognized that while the vibratory apparatus 300 may move the material from the inlet end 320 to the outlet end 322 according to the motion imparted to the trough 302 by the exciter 330, the apparatus 300 may include other equipment for moving or processing the material, as mentioned above. For example, the illustrated embodiment of the apparatus 300 includes an air knife 316, which may be used to separate the material as it moves from the inlet end 320 to the outlet end 322. Consequently, while the apparatus 300 is referred to as a vibratory apparatus, this should not be viewed as limiting the apparatus to the use of only vibratory action to process materials.

While different embodiments of the vibratory apparatus may vary from the illustrated embodiment of FIG. 5, it will be recognized that these embodiments still may have features in common with the illustrated embodiment. For example, certain vibratory apparatuses may have a trough with deck(s) and sidewalls, even if they have no hood. Other apparatuses will include the exciter, even if it is disposed below the trough instead of above. Still other apparatuses are supported from above, rather than being mounted on isolation springs supported on a surface or ground. As such, it may be possible to describe an embodiment of a vibratory apparatus that has fewer than all of the elements described for the illustrated embodiment of FIG. 5, but that still falls within the scope of this patent.

It is possible for the spring assemblies 100 to be used in a vibratory apparatus in other ways, instead of as reactor springs. For example, FIG. 6 illustrates a single-mass, or brute-force, apparatus (feeder) that utilizes a plurality of spring assemblies 100 in a different way: to support the deck of the apparatus on a surface or the ground, for example by being coupled at one end to the deck and at another end to a support structure, frame, or base that may be bolted or otherwise secured to the surface or the ground.

According to such an embodiment, the exemplary apparatus 400 may include a trough 402 with a deck 404, which deck 404 may be solid or may have one or more passages therethrough to permit materials of a first size to move over the deck 404 and of a second, smaller size to pass through the deck 404. The trough 402 may include a floor 406 beneath the deck 404, as illustrated. The deck 404 may be attached at either side to sidewalls 408 (one of which is illustrated in FIG. 6), which sidewalls 408 may also be attached to the floor 406.

The trough 402, and in particular the deck 404, may be supported above a surface or ground by a plurality of spring assemblies 100. The spring assemblies 100 (which may be referred to as isolation springs in this embodiment) may be attached at one end 412 to the trough 402 and at a second end 414 to a base 416, which base 416 may be bolted or otherwise secured to the surface or ground.

A vibration generator (or brute force vibrator) 420 may be coupled to the trough 402, and thus be coupled to the deck 404. The vibration generator 420 may include a motor 422 having a shaft 424 to which one or more eccentric weights 426 are attached, for example. According to other embodiments, the vibration generator 420 may include pneumatic and/or hydraulic actuators instead of the motor 422. For that matter, the shaft 424 and weights 426 may be attached to the trough 402, while the motor 422 is coupled to the shaft 424, but not mounted on the apparatus 400. A controller 428 may be included and coupled to the motor 422 to control operation of the motor 422.

Again, while different embodiments of the vibratory apparatus may vary from the illustrated embodiment of FIG. 6, it will be recognized that these embodiments still may have features in common with the illustrated embodiment. For example, certain vibratory apparatuses may have a trough with deck(s) and sidewalls, even if they have no floor. Other apparatuses will include the vibration generator, even if it is disposed below the trough instead of above. Still other apparatuses are supported using the spring assemblies 100 in combination with links or rocker arms. As such, it may be possible to describe an embodiment of a vibratory apparatus that has fewer than all of the elements described for the illustrated embodiment of FIG. 6, but that still falls within the scope of this patent.

It will also be recognized that the spring assembly according to one of the disclosed embodiments and/or a vibratory apparatus including one or more such spring assemblies may provide one or more of the following advantages. The spring assemblies provide attachment sites where the fasteners, e.g. nut/bolt pairs, are disposed transverse to the longitudinal axis of the resilient member. As such, the fastener is loaded transversely or perpendicularly to its axis, which is believed to reduce the chances that the fastener will loosen with repeated vibratory loadings. Further, the attachment site is disposed entirely exterior to the helical portion of the resilient member, facilitating access for installation and/or maintenance. The exposed attachment site is also more accessible for purposes of applying protective coatings to limit exposure where the spring assembly is used on a vibratory apparatus in a challenging environment (e.g., an environment with high amounts of moisture). Further, because of the nature of the attachment site on the vibratory apparatus side, it is not necessary (or perhaps even desirable) to pass through the vibratory apparatus (e.g., a wall) and then the distal end of the end shank to attach the spring assembly to the vibratory apparatus. This permits a shorter length of fastener to be used. Other advantages are also possible.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A spring assembly comprising:
   a resilient member having a first end shank, a second end shank, and a central helical portion,
     the first end shank extending in a first direction from the central helical portion from a proximal end to a distal end, the first end shank having a longitudinal axis from the proximal end to the distal end,
     the second end shank extending in a second direction from the central helical portion from a proximal end to a distal end, the second end shank having a longitudinal axis from the proximal end to the distal end, the second direction being opposite the first direction,
     the first end shank and the second end shank each comprise a linear bar having a quadrilateral cross-section in a plane perpendicular to the respective longitudinal axis, and
     the central helical portion including one or more coils disposed about a central longitudinal axis, the central helical portion having a first end attached to the proximal end of the first end shank and a second end attached to the proximal end of the second end shank,
     the longitudinal axis of the first shank end, the longitudinal axis of the second shank end, and the central longitudinal axis of the central helical portion being collinear; and
   a transverse attachment site at each of the first end shank and the second end shank configured to receive a fastener.

2. The spring assembly according to claim 1, wherein the quadrilateral cross-section in a plane perpendicular to the longitudinal axis is rectangular.

3. The spring assembly according to claim 1, wherein the quadrilateral cross-section in a plane perpendicular to the longitudinal axis is square.

4. The spring assembly according to claim 1, wherein at least one of the first end shank and the second end shank has a hole formed therethrough, the hole having an axis that is transverse to the longitudinal axis of the respective first end shank or the second end shank and defining the attachment site.

5. The spring assembly according to claim 4, wherein both of the first end shank and the second end shank have the hole formed therethrough having an axis that is transverse to the longitudinal axis of the respective first end shank or the second end shank and defining the attachment site.

6. The spring assembly according to claim 1, wherein:
the first end shank and the second end shank comprise a linear bar having a rectangular cross-section in a plane perpendicular to the longitudinal axis,
the linear bar having opposing sides of first dimension in a plane perpendicular to the longitudinal axis and opposing ends of second dimension in a plane perpendicular to the longitudinal axis, the first dimension being larger than the second dimension,
the linear bar having at least one hole extending between the opposing sides of the first end shank and at least one hole extending between the opposing sides of the second end shank and defining the attachment site.

7. The spring assembly according to claim 1, the attachment site comprising a clamp attached to one of the first end shank and the second end shank, the clamp having at least one hole therethrough configured to accept a bolt.

8. The spring assembly according to claim 7, wherein the clamp is attached to each of the first end shank and the second end shank, each clamp having at least one hole therethrough configured to accept a bolt.

9. The spring assembly according to claim 1, wherein the central helical portion comprises a plurality of coils disposed about the central longitudinal axis.

10. A spring assembly comprising:
a resilient member having a first end shank, a second end shank, and a central helical portion,
the first end shank extending in a first direction from the central helical portion from a proximal end to a distal end, the first end shank having a longitudinal axis from the proximal end to the distal end,
the second end shank extending in a second direction from the central helical portion from a proximal end to a distal end, the second end shank having a longitudinal axis from the proximal end to the distal end, the second direction being opposite the first direction, and
the central helical portion including one or more coils disposed about a central longitudinal axis, the central helical portion having a first end attached to the proximal end of the first end shank and a second end attached to the proximal end of the second end shank,
the longitudinal axis of the first shank end, the longitudinal axis of the second shank end, and the central longitudinal axis of the central helical portion being parallel to each other or are collinear; and
a transverse attachment site at each of the first end shank and the second end shank,
the attachment site comprising a clamp attached to one of the first end shank and the second end shank,
wherein the clamp comprises a central holder configured to receive the one of the first end shank and the second end shank, and first and second distal ends disposed transverse to the longitudinal axis of the one of the first end shank and the second end shank, each of the distal ends having a hole therethrough configured to accept a bolt.

11. A vibratory apparatus comprising:
a deck;
an exciter assembly coupled to the deck, the exciter assembly comprising at least one eccentric mounted on a shaft, the shaft coupled to the deck with one or more spring assemblies, each of the spring assemblies comprising:
a resilient member having a first end shank, a second end shank, and a central helical portion,
the first end shank extending in a first direction from the central helical portion from a proximal end to a distal end, the first end shank having a longitudinal axis from the proximal end to the distal end,
the second end shank extending in a second direction from the central helical portion from a proximal end to a distal end, the second end shank having a longitudinal axis from the proximal end to the distal end, the second direction being opposite the first direction, and
the central helical portion including one or more coils disposed about a central longitudinal axis, the central helical portion having a first end attached to the proximal end of the first end shank and a second end attached to the proximal end of the second end shank,
the longitudinal axis of the first shank end, the longitudinal axis of the second shank end, and the central longitudinal axis of the central helical portion being parallel to each other or are collinear; and
a transverse attachment site at each of the first end shank and the second end shank, the attachment site of the first end attached to the deck and the attachment site of the second end attached to the exciter assembly.

12. The vibratory apparatus according to claim 11, wherein the first end shank and the second end shank each comprise a linear bar having a quadrilateral cross-section in a plane perpendicular to the respective longitudinal axis, and the longitudinal axis of the first shank end, the longitudinal axis of the second shank end, and the central longitudinal axis of the central helical portion are collinear.

13. The vibratory apparatus according to claim 11, wherein at least one of the first end shank and the second end shank has a hole formed therethrough, the hole having an axis that is transverse to the longitudinal axis of the respective first end shank or the second end shank and defining the attachment site.

14. The vibratory apparatus according to claim 11, wherein:
the first end shank and the second end shank comprise a linear bar having a rectangular cross-section in a plane perpendicular to the longitudinal axis,
the linear bar having opposing sides of first dimension in a plane perpendicular to the longitudinal axis and opposing ends of second dimension in a plane perpendicular to the longitudinal axis, the first dimension being larger than the second dimension,
the linear bar having at least one hole extending between the opposing sides of the first end shank and at least one hole extending between the opposing sides of the second end shank and defining the attachment site.

15. The vibratory apparatus according to claim 11, the attachment site comprising a clamp attached to one of the first end shank and the second end shank, the clamp comprising a central holder configured to receive the one of the first end shank and the second end shank, and first and second distal ends disposed transverse to the longitudinal axis of the one of the first end shank and the second end shank, each of the distal ends having a hole therethrough configured to accept a bolt.

16. A vibratory apparatus comprising:
a deck;
a vibration generator coupled to the deck; and
one or more spring assemblies coupled to the deck to support the deck on a surface, each of the spring assemblies comprising:

a resilient member having a first end shank, a second end shank, and a central helical portion, the first end shank extending in a first direction from the central helical portion from a proximal end to a distal end, the first end shank having a longitudinal axis from the proximal end to the distal end, the second end shank extending in a second direction from the central helical portion from a proximal end to a distal end, the second end shank having a longitudinal axis from the proximal end to the distal end, the second direction being opposite the first direction, and the central helical portion including one or more coils disposed about a central longitudinal axis, the central helical portion having a first end attached to the proximal end of the first end shank and a second end attached to the proximal end of the second end shank, the longitudinal axis of the first shank end, the longitudinal axis of the second shank end, and the central longitudinal axis of the central helical portion being parallel to each other or are collinear; and a transverse attachment site at each of the first end shank and the second end shank, the attachment site of the first end shank attached to the deck and the attachment site of the second end shank attached to the surface.

17. The vibratory apparatus according to claim 16, wherein the first end shank and the second end shank each comprise a linear bar having a quadrilateral cross-section in a plane perpendicular to the respective longitudinal axis, and the longitudinal axis of the first shank end, the longitudinal axis of the second shank end, and the central longitudinal axis of the central helical portion are collinear.

18. The vibratory apparatus according to claim 16, wherein at least one of the first end shank and the second end shank has a hole formed therethrough, the hole having an axis that is transverse to the longitudinal axis of the respective first end shank or the second end shank and defining the attachment site.

19. The vibratory apparatus according to claim 16, wherein:

the first end shank and the second end shank comprise a linear bar having a rectangular cross-section in a plane perpendicular to the longitudinal axis, the linear bar having opposing sides of first dimension in a plane perpendicular to the longitudinal axis and opposing ends of second dimension in a plane perpendicular to the longitudinal axis, the first dimension being larger than the second dimension, the linear bar having at least one hole extending between the opposing sides of the first end shank and at least one hole extending between the opposing sides of the second end shank and defining the attachment site.

20. The vibratory apparatus according to claim 16, the attachment site comprising a clamp attached to one of the first end shank and the second end shank, the clamp comprising a central holder configured to receive the one of the first end shank and the second end shank, and first and second distal ends disposed transverse to the longitudinal axis of the one of the first end shank and the second end shank, each of the distal ends having a hole therethrough configured to accept a bolt.

* * * * *